(12) United States Patent
Klassen et al.

(10) Patent No.: US 6,640,980 B2
(45) Date of Patent: Nov. 4, 2003

(54) SWITCHGEAR CABINET INCLUDING FRAMEWORK AND COVERING MEMBERS

(75) Inventors: Samuel Klassen, Haiger (DE); Heiko Holighaus, Eschenburg (DE)

(73) Assignee: RITTAL RCS Communication, Haiger (DE)

( * ) Notice: Subject to any disclaimer, the term of this patent is extended or adjusted under 35 U.S.C. 154(b) by 0 days.

(21) Appl. No.: 10/102,562

(22) Filed: Mar. 20, 2002

(65) Prior Publication Data

US 2002/0167252 A1 Nov. 14, 2002

(30) Foreign Application Priority Data

Mar. 21, 2001 (DE) .......................................... 101 13 935

(51) Int. Cl.[7] .................................................. A47F 7/00
(52) U.S. Cl. ...................... 211/26; 211/189; 312/265.3; 312/265.4
(58) Field of Search .......................... 211/189, 26, 190, 211/182, 191, 26.2; 361/829; 312/265.1–265.6, 223.1, 257.1, 263

(56) References Cited

U.S. PATENT DOCUMENTS

| | | | |
|---|---|---|---|
| 4,884,715 A | * 12/1989 | Pohlmann | 220/683 |
| 4,968,105 A | * 11/1990 | Schaars | 312/140 |
| 5,152,231 A | * 10/1992 | Preston et al. | 312/214 |
| 5,202,818 A | * 4/1993 | Betsch et al. | 361/829 |
| 5,669,232 A | * 9/1997 | Iwamoto et al. | 312/401 |
| 5,769,519 A | * 6/1998 | Nicolai | 312/351.1 |
| 5,806,946 A | * 9/1998 | Benner et al. | 312/265.3 |
| 5,971,511 A | * 10/1999 | Diebel et al. | 312/265.3 |
| 6,012,791 A | * 1/2000 | Benner et al. | 312/265.2 |
| 6,030,063 A | * 2/2000 | Benner | 312/265.1 |
| 6,206,494 B1 | * 3/2001 | Benner et al. | 312/265.4 |
| 6,238,028 B1 | * 5/2001 | Benner et al. | 312/265.3 |
| 6,348,656 B1 | * 2/2002 | Thielmann et al. | 174/50 |

* cited by examiner

Primary Examiner—Daniel P. Stodola
Assistant Examiner—Jennifer E. Novosad
(74) Attorney, Agent, or Firm—Pauley Petersen & Erickson

(57) ABSTRACT

A switchgear cabinet including rectangular framework of frame members, wherein, in the region of the outside edge corners, free spaces are formed to accommodate angled edges of the double-wall covering members, which abut each other. If at least the angled edges of the exterior walls of the vertical covering member have two angled portions, the interior walls of the covering members with their inner surfaces in the outer planes, directly or via sealing members, fit onto abutment profile sides of the frame members of the framework and are connected in front of the angled end portions of the exterior walls. The angled end portions of the exterior walls extend parallel to the angle bisector of the frame members, which cut against each other, and with their outer corners are at a predetermined spacing from the angle bisector, and thus security against vandalism is improved in the region of the outer edge corners, without impairing the symmetrical appearance of the outer edge regions and the arbitrary attachment of the double-wall covering members and cabinets doors on the framework.

22 Claims, 1 Drawing Sheet

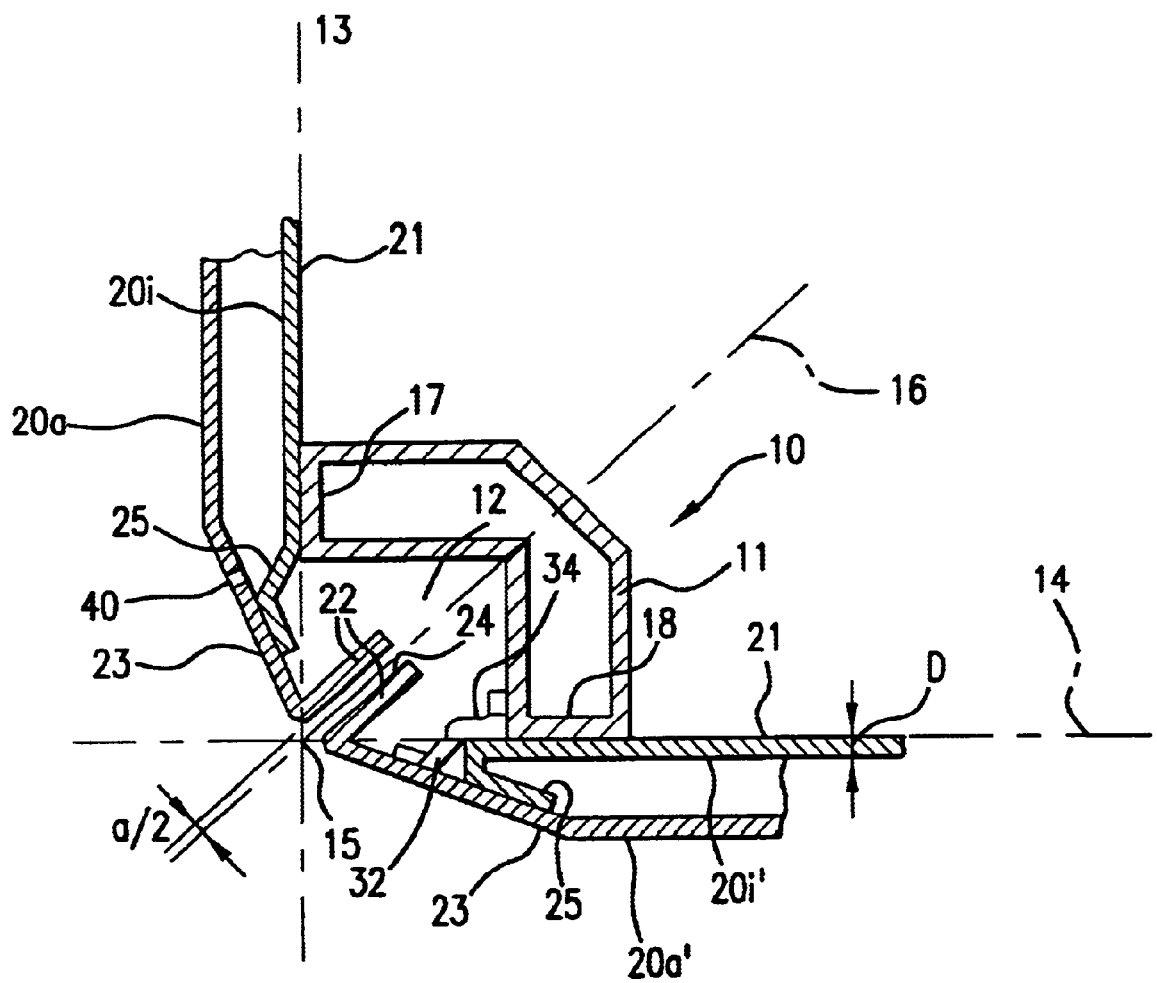

SWITCHGEAR CABINET INCLUDING FRAMEWORK AND COVERING MEMBERS

BACKGROUND OF THE INVENTION

1. Field of the Invention

This invention relates to a switchgear cabinet including a rectangular framework of frame members, wherein in a region of outer edge corners, free spaces are formed for accommodation of angled edges of double-wall covering members, which are juxtaposed with respect to each other.

2. Description of Prior Art

To protect components, modules and similar structures, which are accommodated in the interior of the switchgear cabinet, from fire, theft, vandalism and the like, the sides of the framework are closed by double-wall covering members. Thus, one object is to make it difficult or impossible to insert tools in regions of the outer edge corners to pry open hinges of the covering members and cabinet doors. The double-wall configuration of the covering members and cabinet doors also prevents the interior of the switchgear cabinet from heating up due to the rays from the sun when the cabinet is outside.

SUMMARY OF THE INVENTION

It is one object of this invention to provide a switchgear cabinet wherein in the region of the covering members, which abut or are juxtaposed each other at a right angle, such as in the regions of the outer corner edges, to provide a transition portion, which is symmetrical to an associated angle bisector and has a high degree of security against vandalism, without making unnecessarily difficult the development and attachment of the double-wall covering members on the framework.

This object is achieved according to this invention because at least the angled edges of the exterior walls of the vertical covering members have two angled portions. The interior walls of the covering members with their inner surfaces in the outer planes, directly or via sealing members, fit onto abutment profile sides of the frame members of the framework and are connected to the inner sides of the angled portions in front of the angled end portions of the exterior walls. The angled end portions of the exterior walls extend parallel to the angle bisector of the covering members, which cut against each other, and with their outer corners are at a predetermined spacing from the angle bisector.

The angled end portions of the edges of the exterior walls of the covering members, which abut each other, in the region of all of the outer corner edges in the region of all of the vertical covering members, form a transition portion, which is symmetrical to the outer corner edge, with only a narrow gap, in which it is not possible to insert or place a tool for the purposes of wrenching open the covering members in such a way that the necessary force can be transmitted effectively to the covering members. The installation and mounting of the covering members in the region of the outer planes of the framework via the abutment profile sides thus remains unaffected. The transition portions of the covering members in the region of the outer corner edges are consequently sufficiently closed and secured against vandalism.

Covering members and cabinet doors are angled in a uniform manner and can be combined in an arbitrary manner on the vertical sides of the framework, without changing the appearance in the region of all of the vertical outer edge corners.

According to another embodiment, the interior walls of the covering members in the region of the facing free space of the framework are angled in the direction towards the angled portions of the exterior walls and are mounted on the inner sides of the angled portions of the exterior walls with connecting portions. The interior wall can then be fixedly connected to the exterior wall without affecting the gap between the angled end portions of the covering members, which abut each other. The covering members then enclose a cavity, which can be filled with fire-resistive and/or sound-absorbing material.

So that the gap can be maintained as deep and narrow as possible, in one embodiment the angled end portions of the exterior walls emerge from the region of the virtual outer edge and extend at least over a large portion of the free spaces. The predetermined spacing between the outsides of the angled portions and facing angle bisector is smaller than the thickness of the interior and exterior walls of the covering members.

The connection between the coving members and the framework is achieved according to one development such that planes of the inner sides of the interior walls of the covering members, which abut each other, intersect at the facing, virtual outer corner edge. The interior walls then rest on the outer corners of the abutment profile sides of the frame members and can there be connected.

The transition portions between the exterior walls of the covering members, which abut each other at a right angle, can be designed so that the angled portions of the exterior walls merge into the angled end portions via a plurality of angled portions, to obtain various designs.

All of the horizontal and vertical outer edge corners can be designed in an identical manner, if the exterior walls on all of the four sides have this type of angled edge, which, in the region of the corners of the covering members, merge into correspondingly offset edges, which lie in the planes of the angle bisector of the covering members and are preferably interconnected.

For access to the interior of the switchgear cabinet, at least one double-wall covering member is configured as a cabinet door and is pivotally mounted on the framework with one vertical side by hinged members. In this connection, for the pivotal mounting and for the closure of the cabinet door, the cabinet door has hinged members on the inner side of the angled portions of the exterior wall, externally of the interior wall, which hinged members are coupled to counter-hinged members, which are mounted in the free space of the facing frame member on a profile side thereof. Closure members and counter-closure members are correspondingly disposed and mounted on the opposite, vertical side.

BRIEF DESCRIPTION OF THE DRAWING

This invention is described in view of the drawing, which is a horizontal partial cross-section taken through a vertical corner region of the switchgear cabinet.

DESCRIPTION OF PREFERRED EMBODIMENTS

A cross-section as shown in the drawing can be established in each region of a horizontal and vertical virtual outer corner edge 15 of the framework 10. However, it is also possible for the sides of the covering members to be configured in this way, only at the vertical outer corner edges.

The frame members 11 of the framework 10 provide a free space 12 towards the outer edge corner 15 free for the angled portions of the covering members. The outer planes 13 and 14 are defined by the outer corners or the abutment profile sides 17 and 18 of the frame member 11. The frame members 11 are mirror-image inverted relative to the angle bisector 16 between the outer planes 13 and 14 of the covering members, which are juxtaposed with respect to each other at a right angle in the region of the outer edge corners 15.

The covering members are configured in a double-wall manner with an interior wall 20i or respectively 20i' and an exterior wall 20a or respectively 20a' and enclose a cavity, which can be filled with fire-resistive and/or sound-absorbing material or the like.

The inner sides 21 of the interior walls 20i and 20i' lie in the associated outer planes 13 and 14 of the framework 10. The exterior walls 20a and 20a' extend at a defined spacing from the interior walls 20i and 20i'. In the edge regions, the exterior walls 20a and 20a' are angled towards the associated outer corner plane, as evident from the angled portions 23 and 22. The angled end portion 22 originates in the region of the outer edge corner 15 and extends into the free space 12 so an outside corner 24 of the angled portion 22 is at the predetermined spacing of a/2 parallel to the angle bisector 16. The two angled end portions 22 of the two exterior walls 20a and 20a' form a narrow gap, which emerges from the outer edge corner 15 and extends into the free space 12. The gap has a width a, which is preferably smaller than a thickness D of the interior walls 20i and 20i', and of the exterior walls 20a and 20a'. The angled portion 23 between the exterior wall 20a or respectively 20a' and the angled end portion 22 can also include a plurality of angled portions. This transition portion, however, always leads to an angled end portion 22 in the described orientation. Up to the free space 12, the interior walls 20i and 20i' fit onto the abutment profile sides 17 and 18 of the frame members 11 and are thereafter angled in the direction towards the inner side of the angled portion 23 and end in connection portions 25, which are connected to the angled portions 23 of the exterior walls 20a and 20a'. Consequently, the space between the inner sides of the angled end portions 22 and the angled portions 23 remains free, so that with the configuration of a covering member as a cabinet door, there is enough space available for the accommodation of hinging members (32) and counter-hinging members (34) as well as closure members and counter-closure members.

In all of the horizontal and vertical outer edge corners 15 of the framework 10 are thus designed, corresponding angled portions 23 and angled end portions 22 are attached on all of the sides of the interior walls 20i or respectively 20i' and of the exterior walls 20a or respectively 20a'. However, it can also be sufficient to design only the vertical sides of the vertical covering members accordingly.

As shown in the partial section in the drawing, the angled portion of the interior wall 20i or respectively 20i' can end in the direction towards the outer edge corner 15 or away from the same. The connection portion 25 at the end of this angled portion extends parallel to the angled portion 23 of the exterior wall 20a or respectively 20a' and is connected to its inner side, for example by welding.

The angled end portions 22 of the interior walls 20i and 20i' can be bent inwardly at the free ends and also in the direction towards the inner sides 21 of their associated interior walls 20i and 20i'.

If at least the vertical covering members and cabinet doors in the region of the horizontal sides have ventilation holes, such as similar to the ventilation hole 40, in the angled portions of the exterior walls 20a, 20a' or are not angled, the covering members and cabinet doors can then also be used for ventilation purposes.

German Patent Reference 101 13 935.7, the priority document corresponding to this invention, and its teachings are incorporated, by reference, into this specification.

We claim:

1. In a switchgear cabinet including rectangular framework of frame members and double-walled covering members, wherein in a region of outer edge corners of the switchgear cabinet free spaces are formed for accommodation of angled edges of the double-wall covering members which are juxtaposed or abut each other, the improvement comprising:

angled edges of exterior walls (20a, 20a') of covering members having angled portions (23) and angled end portions (22), interior walls (20i, 20i') of the covering members having inner surfaces (21) aligned in outer planes (13, 14) of the framework (10), the interior walls (20i, 20i') fitting onto abutment profile sides (17, 18) of the frame members (11) of the framework (10) directly or with sealing members, the interior walls (20i, 20i') connected to inner sides of the angled portions (23) of the exterior walls (20a, 20a'), the angled end portions (22) of the exterior walls (20a, 20a') extending parallel to an angle bisector (16) of the outer planes (13, 14) of the framework (10), the angled end portions (22) having outside corners (24) at a predetermined spacing (a/2) from the angle bisector (16).

2. In the switchgear cabinet according to claim 1, wherein the interior walls (20i, 20i') of the covering members in the region of the free spaces (12) of the framework (10) are angled (25) towards the angled portions (23) of the exterior walls (20a, 20a') and are mounted with connecting portions on insides of the angled portions (23) of the exterior walls (20a, 20a').

3. In the switchgear cabinet according to claim 2, wherein the angled end portions (22) of the exterior walls (20a, 20a') extend inward in regions of outer edge corners and over at least a portion of the free spaces (12).

4. In the switchgear cabinet according to claim 3, wherein the predetermined spacing (a/2) between the outside corners (24) of the angled end portions (22) and the angle bisector (16) is smaller than a thickness (D) of the interior and exterior walls (20i, 20i' and 20a, 20a') of the covering members.

5. In the switchgear cabinet according to claim 4, wherein two covering members are juxtaposed with respect to each other and planes of the inner surfaces (21) of the interior walls (20i, 20i') of the covering members intersect in a region of an outer edge corner (15).

6. In the switchgear cabinet according to claim 4, wherein the angled portions (23) of the exterior walls (20a, 20a') merge into the angled end portions (22) and include a plurality of angled portions.

7. In the switchgear cabinet according to claim 6, wherein cavities of the double-wall covering members are filled with at least one of a fire-resistive material and a sound-absorbing material.

8. In the switchgear cabinet according to claim 7, wherein the exterior walls (20a, 20a') on four sides have angled edges near the corners of the covering members, and the angled portions (23) of the angled edge merge into the angled end portions (22) having edges in planes parallel to an angle bisector of the covering members.

9. In the switchgear cabinet according to claim 8, wherein at least one of the double-wall covering members is configured as a cabinet door and is pivotally mounted on the framework (10) with hinged members.

10. In the switchgear cabinet according to claim 9, wherein the hinged members are on an inner side of the angled portions (23) of the exterior wall (20*a'*) externally of the interior wall (20*i*), the hinged members coupled to counter-hinged members mounted in the free space (12) on a profile side of a facing frame member (11), and the cabinet door has closure members and counter-closure members correspondingly mounted on an opposite vertical side of the cabinet door from the hinged members.

11. In the switchgear cabinet according to claim 10, wherein the angled end portions (22) of the interior walls (20*i*, 20*i'*) at free ends are bent inwardly towards the inner sides (21) of their interior walls (20*i*, 20*i'*).

12. In the switchgear cabinet according to claim 11, wherein vertical covering members and the cabinet door in the region of the horizontal sides have ventilation openings in the angled portions of the exterior walls (20*a*, 20*a'*).

13. In the switchgear cabinet according to claim 1, wherein the angled end portions (22) of the exterior walls (20*a*, 20*a'*) extend inward in regions of outer edge corners and over at least a portion of the free spaces (12).

14. In the switchgear cabinet according to claim 1, wherein the predetermined spacing (a/2) between the outside corners (24) of the angled end portions (22) and the angle bisector (16) is smaller than a thickness (D) of the interior and exterior walls (20*i*, 20*i'* and 20*a*, 20*a'*) of the covering members.

15. In the switchgear cabinet according to claim 1, wherein two covering members are juxtaposed with respect to each other and planes of the inner surfaces (21) of the interior walls (20*i*, 20*i'*) of the covering members intersect in a region of an outer edge corner (15).

16. In the switchgear cabinet according to claim 1, wherein the angled portions (23) of the exterior walls (20*a*, 20*a'*) merge into the angled end portions (22) and include a plurality of angled portions.

17. In the switchgear cabinet according to claim 1, wherein cavities of the double-wall covering members are filled with at least one of a fire-resistive material and a sound-absorbing material.

18. In the switchgear cabinet according to claim 1, wherein the exterior walls (20*a*, 20*a'*) on four sides have angled edges near the corners of the covering members, and the angled portions (23) of the angled edges merge into the angled end portions (22) having edges in planes parallel to an angle bisector of the covering members.

19. In the switchgear cabinet according to claim 1, wherein at least one of the double-wall covering members is configured as a cabinet door and is pivotally mounted on the framework (10) with hinged members.

20. In the switchgear cabinet according to claim 19, wherein the hinged members are on an inner side of the angled portions (23) of the exterior wall (20*a'*) externally of the interior wall (20*i*), the hinged members coupled to counter-hinged members mounted in the free space (12) on a profile side of a facing frame member (11), and the cabinet door has closure members and counter-closure members correspondingly mounted on an opposite vertical side of the cabinet door from the hinged members.

21. In the switchgear cabinet according to claim 1, wherein the angled end portions (22) of the interior walls (20*i*, 20*i'*) at free ends are bent inwardly towards the inner sides (21) of their interior walls (20*i*, 20*i'*).

22. In the switchgear cabinet according to claim 19, wherein vertical covering members and the cabinet door in the region of the horizontal sides have ventilation openings in angled portions of the exterior walls (20*a*, 20*a'*).

\* \* \* \* \*